COLOR TELEVISION DEMODULATION SYSTEM

Filed Feb. 12, 1968 2 Sheets-Sheet 1

INVENTORS
FRANCIS H. HILBERT
NORMAN W. PARKER

BY Mueller, Aichele & Rauner
ATTORNEYS.

INVENTORS.
FRANCIS H. HILBERT
NORMAN W. PARKER
BY Mueller, Aichele & Rauner
ATTORNEYS.

United States Patent Office 3,405,231

Patented Oct. 8, 1968

3,405,231

COLOR TELEVISION DEMODULATION SYSTEM

Francis H. Hilbert, River Grove, and Norman W. Parker, Wheaton, Ill., assignors to Motorola, Inc., Franklin Park, Ill., a corporation of Illinois Continuation-in-part of application Ser. No. 504,523, Oct. 24, 1965. This application Feb. 12, 1968, Ser. No. 704,659

9 Claims. (Cl. 178—5.4)

ABSTRACT OF THE DISCLOSURE

A direct demodulator for a composite color television signal decodes the combined video frequency brightness components and the chroma subcarrier. The demodulator output comprises a signal representing brightness, hue and saturation of the television image. Since the brightness components also beat with the demodulator control or reference signal of the subcarrier frequency, thereby producing a spurious signal accompanying the desired signal, a secondary demodulator section is used to provide a cancellation signal at the output of the demodulator in order to eliminate the spurious signal.

*Cross reference*

This application is a continuation-in-part of our application Ser. No. 504,523 filed Oct. 24, 1965 and now abandoned.

*Background*

The presently used color television signal is comprised of brightness or luminance components in a frequency range from zero to several megacycles, and a frequency and amplitude modulated subcarrier at approximately 3.58 mHz, which represents the hue and saturation of the image, i.e. "color less brightness." The brightness components and the modulated subcarrier overlap in frequency to restrict the bandwidth and conserve spectrum use. Interference between these signal components is limited because each is comprised of energy bunches which are interleaved in the spectrum in accordance with known principles.

In many instances the chroma subcarrier is band selected and synchronously demodulated at three different phases to produce color difference signals ($R-Y$, $B-Y$ and $G-Y$) which are subsequently combined with the brightness signal Y to produce color representative signals R, B and G for reproducing a composite image in the picture tube. In some color television systems a composite signal is applied directly to a demodulator so that a color representative signal is produced without a matrixing operation, but these systems have not been altogether satisfactory because a spurious signal is developed due to the close spectrum relationship of the brightness and subcarrier components so that the produced television image is impaired by a spurious pattern.

An object of this invention is to obviate the production of a spurious modulation component in such a direct color signal demodulator.

Another object is to simplify the circuitry for a color signal demodulator which directly produces red, blue and green representative signals.

A further object is to provide improved semiconductor circuitry for demodulating a color television signal of the NTSC type.

*Summary*

The demodulation system of this invention is a direct color signal decoder which phase detects a color subcarrier signal along with the associated brightness signal. The subcarrier signal is modulated at different phase angles to represent saturation of a particular color of the image. Three direct, primary demodulators produce red, blue and green representative signals including the associated brightness information so that these signals can be coupled to the picture tube for reproduction. Since the brightness signal components extend in frequency up to and generally into the frequency range of the subcarrier modulation band, these components modulate with the subcarrier reference signal to produce a lower modulation sideband of the reference signal which falls in the frequency range from the color subcarrier down into the range of the color representative signals. Such spurious signals are reduced through the use of a secondary demodulator which modulates the brightness signal components with a reverse phase form of the reference signal thereby forming a spurious signal cancellation signal which is coupled to the output of the primary demodulator circuitry. In one particular form this can be implemented by using a balanced demodulator to which the brightness components are applied in the same phase and the subcarrier components at controlled amplitudes are applied in opposite phase for direct demodulation without spurious signal components.

*The drawing*

*Embodiments*

Figure 1:
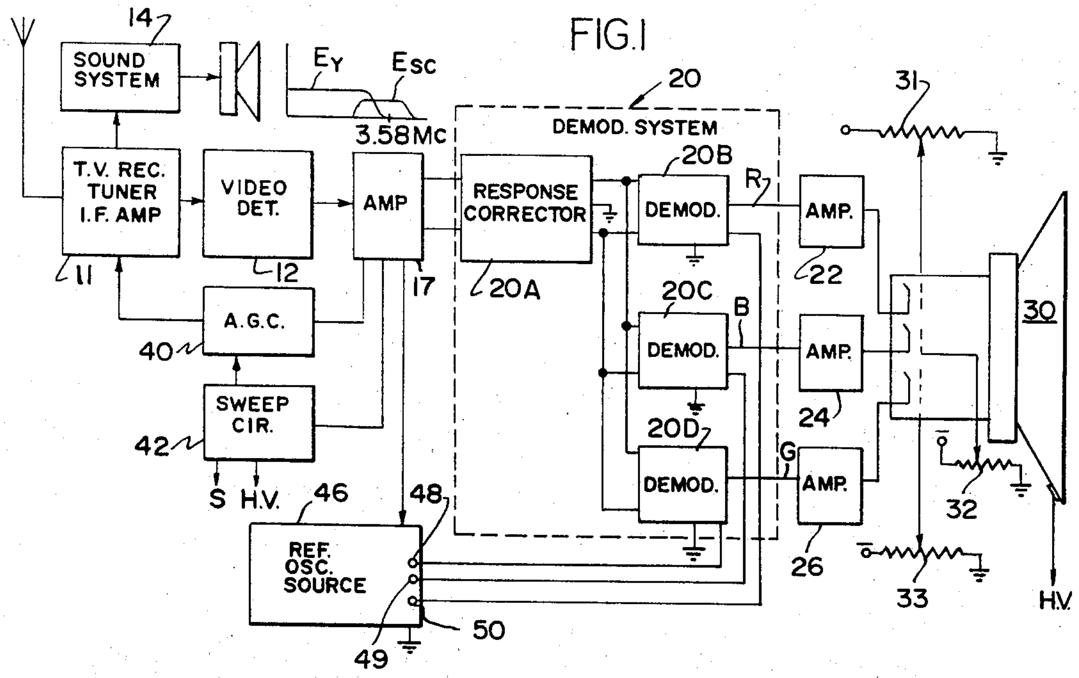
FIG. 1 is a block diagram of a color television receiver for explaining certan aspects of the invention.

The color television receiver of FIG. 1 includes tuner and IF amplifier stages 11 which provide a selected and amplified television signal and apply it to the video detector 12. Circuitry 11 also applies a signal to the sound system 14 for demodulation and amplification of the sound subcarrier to drive the loudspeaker 15.

The demodulated signal from the video detector 12 is direct current coupled to an amplifier 17 and from there to the demodulation system 20 which provides separate red, blue and green representative signals to the respective amplifiers 22, 24 and 26. These amplifiers are individually connected to the cathodes of the tri-beam cathode ray tube 30 to drive the electron guns in this tube in accordance with known operation for production of a composite image in color.

The image reproducer tube 30 includes a plurality of control grids which are connected to the arms of potentiometers 31, 32 and 33 to provide a fixed bias for these grids and control image brightness or beam current for the guns of the tube 30.

The signal amplifier 17 is also coupled to an AGC system 40 which is gated to provide a control potential that is variable with the amplitude of a received signal in order to adjust the gain of the stages in circuitry 11 and maintain a relatively constant amplitude of the signal derived in the video detector 12. Amplifier 17 also feeds the sweep or deflection circuitry 42 which is coupled to the deflection yoke 44 to provide suitable sawtooth scanning current for deflection of the beams of the tube 30. The sweep circuit 42 also generates a suitable high voltage for the screen of the tube 30 in accordance with known practice.

Amplifier 17 may also supply a control signal to the reference oscillator 46 in order to generate an accurately phase controlled reference signal for demodulation of the suppressed subcarrier which is modulated with chrominance information in the composite television signal. In accordance with usual practice, the synchronizing pulses in the television signal which are utilized to control the sweep circuitry 42, are also accompanied by short bursts of control signals at approximately 3.58 mHz. to be used for synchronization of the oscillator 46. Three different phases of the oscillator signal are produced at the output terminals 48, 49 and 50. The exact phase angles of the signals is determined by several different variables within the receiver itself, such as the dominant color of emission of the various phosphors in the screen of tube 30. As an example the signal at terminal 48 may be at approximately 240° with respect to the blue color difference signal, the signal at terminal 49 may be at approximately 0° and the signal at terminal 50 may be at approximately 97° with respect to the blue color difference signal.

Figure 2:
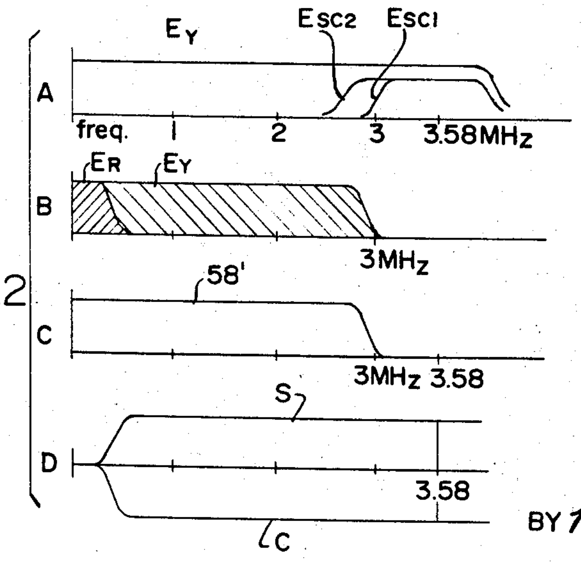
FIG. 2 is a series of frequency response curves useful in explaining operation of the invention.

A signal applied to the input circuit 20A of the demodulator is illustrated in the response vs. frequency curve of the FIG. 2A. The video frequency brightness components $E_Y$ etxend from zero to over 2 mHz. and sometimes as high as 3 or 4 mHz. The subcarrier wave representing chrominance or color difference information is modulated at approximately 3.58 mHz. with the component of one phase $E_{SC1}$ in a band of approximately .5 mHz., and in another phase as a vestigial sideband signal $E_{SC2}$ with the lower sideband extending below 3 mHz. Present day receivers generally use a subcarrier bandwidth of approximately .5 mHz. total for all subcarrier components and the following description will assume such operation. However it will be apparent that the principles discussed are equally applicable to deriving color components at various bandwidths and producing the color signals directly from them.

It should further be noted that the frequency response characteristics of the various parts of the receiver can be modified and correlated in accordance with known receiver design to establish an overall desired video response. This correlation within the receiver need not be discussed to understand the present invention.

The NTSC signal has video frequency brightness components in the following relationship in order to improve compatibility for reception by a monochrome receiver so that its grey scale of a color image will be in accord with the visual response of the colors by the human eye. The brightness signal is as follows:

$$(1) \quad E_Y = 0.30E_R + 0.59E_G + 0.11E_B$$

In this formula $E_Y$ represents a signal voltage of a luminance component of a picture element and $E_R$, $E_G$ and $E_B$ are respectively the signal voltages representing the colors red, green and blue for that picture element. The chrominance modulated subcarrier wave is represented as follows:

$$(2) \quad E_{SC} = K_1(E_R - E_Y)\cos\omega t + K_2(E_B - E_Y)\sin\omega t$$

In terms of the green chrominance component the subcarrier can be represented as:

$$(3) \quad E_{SC} = K_3(E_G - E_Y)\cos(\omega t + 146°) + K_4\sin(\omega t + 146°)$$

In the above formulas $K_1$ equals 1/1.14; $K_2$ equals 1/2.203; $K_3$ equals 1/0.70; and $K_4$ equals $$.49(E_R - E_Y) - .41(E_B - E_Y)$$

As is understood in the television art the signals are constituted for proper compatibility for monochrome reception of the signal and production of a grey scale matching the color response of the eye, as well as for a limited amplitude swing of the quadrature modulated subcarrier wave with respect to $E_Y$ in order to limit the size of the composite signal ($E_C = E_Y + E_{SC}$) for proper handling in a receiver.

Figure 3:
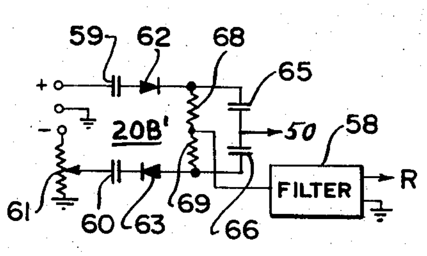
FIG. 3 is a diagram of a circuit useful in the system of FIG. 1.

FIG. 3 represents a direct color signal demodulator. The composite signal, including the brightness components and the subcarrier wave, is applied push-pull to the demodulator 20B' which is controlled in conduction by a reference signal of the subcarrier frequency of proper phase. For example the signal from terminal 50 of oscillator 46 can be used to demodulate for the red representative signal. The output of the demodulator is applied to a video frequency filter 58 to establish a low pass range up to, for example, 3 mHz. to be applied to the amplifier 22 of FIG. 1. The pass range of filter 58 is represented as frequency band 58' in FIG. 2C. The demodulator of FIG. 3 is of the balanced type but partially unbalanced to compensate for the luminance to subcarrier ratio of the composite signal. This unbalance effectively compensates for the demodulator efficiency and the K factors in the equations of the signal.

The circuit of FIG. 3 has input capacitors 59 and 60 to which opposite phases of the composite signal are applied with respect to ground. Capacitor 60 is connected to the arm of variable resistor 61, having a fixed terminal connected to ground and another fixed terminal connected to one of the input terminals of the detector circuit. A diode 62 has an anode connected to capacitor 59 and diode 63 has a cathode connected to capacitor 60. The cathode and anode of diodes 62 and 63 are coupled together to the series combination of capacitors 65, 66, the interconnection of which is coupled to the terminal 50 of the oscillator 46.

The output of the demodulator 20B' is derived at the interconnection of the resistors 68, 69 which are series connected across capacitors 65, 66. This output is applied to the filter 58 to define the video passband.

The operation of the demodulator 20B' in FIG. 3 includes the alternate conduction of the diodes 62, 63 by opposite phases of the color reference signal applied from oscillator 46. Opposite phases of the chrominance modulation components are thus conducted by the diodes to develop a potential at the junction of resistors 68, 69 which represents both the amplitude of the chrominance modulated subcarrier at the phase representing the red signal information in addition to the associated luminance information. Circuit 20B' is unbalanced to a selected degree by adjustment of the variable resistor 61 so that it will conduct the proper amplitude of luminance components to be combined with the demodulated chrominance information for the direct production of the red representative signal. That is resistor 61 is adjusted so that the luminance components are not balanced out through equal and opposite conduction of the diodes 62 and 63.

An understanding of the functioning of the circuit of FIG. 3 can be had by considering the reference signal as a rectangular gating signal causing the demodulator to switch or sample the applied composite input signal by electron control means (e.g. a diode) which is essentially either conductive or nonconductive. Mathematically the operation can be expressed by multiplying the composite color signal $E_C$ by a cyclic function having a value of 1 with the electron control means closed and the value zero when the control means is open. Such a gating signal to demodulate for red information can be represented as:

$$(4) \quad G(t)_R = \Delta T/T(1 + 2A_1\cos\omega t + 2A_2\cos 2\omega t \ldots 2A_n\cos n\omega t)$$

where $$A_n = 1/\pi\int_0^{2\pi} G(t)\cos\omega t\, d\omega$$

and $\Delta T/T$ is the duty cycle

For demodulating the blue signal the cosine terms become sine terms and for the green signal the cosine angle is $\omega + 146°$.

To develop the red representative signal the composite signal $E_C$ is multiplied by the gating function and the product is as follows:

(5) $E_C \times G(t)_R = \Delta T/T(E_Y + K_1(E_R - E_Y)\cos\omega t + K_2(E_B - E_Y)\sin\omega t + 2A_1E_Y\cos\omega t + A_1K_1(E_R - E_Y) + A_1K_1(E_R - E_Y)\cos 2\omega t$ + components $>2$)

In Equation 5 the first and fifth terms combine (by adjusting the unbalance of demodulator 20B′ to control $E_Y$ since $K_1$ is less than 1 and $A_1$ cannot exceed 1) thus producing signal $E_R$ and $E_Y$ of FIG. 2B. Similar demodulation can take place for the blue and green representative signals with proper demodulator unbalance.

The second and third terms of the product are the original subcarrier components which are removed to the extent they fall outside the passband of the filter 202 as seen by comparing the passband of FIG. 2C with the modulation range $E_{SC}$ of FIG. 2A, the wider range chrominance modulation being ignored as previously discussed. The sixth and seventh terms of the demodulation product are at twice the subcarrier frequency and higher so that they fall outside the video signal bandpass F. The fourth term represents a modulation product which is a spurious signal due to beating of the brightness signal $E_Y$ with the first order periodic component of the gating signal. Depending upon the frequency range of the brightness signal applied to the demodulator of FIG. 3, the lower sideband of this spurious component S (FIG. 2D) can extend all the way from the frequency of the reference signal (3.58 mHz.) down to zero, and therefore throughout most or all of the video passband 58′. The higher the frequency of the brightness component applied to the demodulator the lower in frequency the lower sidebands will extend within the output range of filter 58.

Such a spurious signal S may have a substantial amplitude so that it appears as a pulse on the edge of any substantial luminance change in the reproduced image. Since this spurious signal will be changing in phase with others produced by the blue and green signal demodulators this undesired portion of the image will appear to move along the luminance difference transition in the picture giving the appearance of a crawling pattern. Thus the problem is produced when the highest frequency of the brightness signal $E_Y$ is close enough in frequency to that of the reference signal (here 3.58 mHz.) such that their modulation product, or part of it, falls within the low pass range from the demodulator to the picture tube.

It may be seen that the low pass filter 58 will remove the upper sideband component of the fourth term of the modulation product and the carrier thereof, but the lower sideband remains. That portion of the brightness signal $E_Y$ interleaved with the subcarrier $E_{SC}$ in FIG. 2A can be separated from the subcarrier by known comb filter techniques. However those signals may be tolerable in some practical systems and they are not normally removed in the present day commercial receivers. In accordance with teachings hereof the brightness components lower than the lowest selected subcarrier sidebands are prevented from generating cross color interference or spurious signal as described below. If comb filter techniques are used to separate the brightness and chrominance components the spurious signal elimination as described below can be used for the entire luminance range.

This spurious signal S produced by modulation of the reference oscillator signal in the demodulator by a luminance step consists of a signal transient or voltage pulse in the video frequency output of the demodulator and we contemplate cancelling this spurious component by an equal amplitude and opposite phase signal applied at the output of the demodulator that produced the spurious signal. Such a system is shown in FIG. 4.

Figure 4:
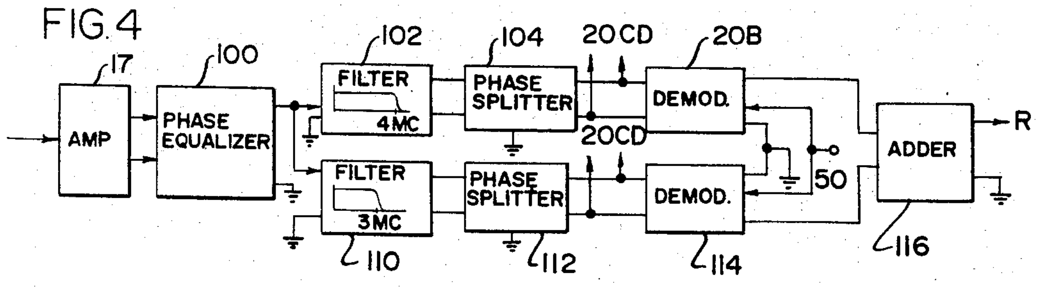
FIG. 4 is a block diagram of one form of the invention.

In FIG. 4 the amplifier 17 provides the demodulated composite video signal including the luminance components and the chrominance modulation components to a phase equalizer 100 which is used to compensate for any high frequency roll-off or other undesired frequency tilt in the composite signal which may be produced as it is translated through the stages 11, 12 in the receiver. The phase equalizer 100 is coupled through a filter 102 that passes all of the luminance and chrominance modulation components to a phase splitter 104. The phase splitter 104 applies opposite phases of the composite video signal to the input terminals of the primary demodulators 20B, C and D, all with respect to ground.

The signals from the phase equalizer 100 are also applied through a filter 110 to a phase splitter 112. It is noted that the filter 110 passes only the luminance components to the exclusion of the chrominance modulation components so that phase splitter 112 couples opposite phases of the luminance components to demodulator 114. A reference oscillator signal from terminal 50 is applied to both the desired signal demodulator 20B and to the cancelling signal or secondary demodulator 114.

As previously described, the output of the demodulator 20B will, due to its unbalance and the modulation of the reference signal by the luminance components, produce a spurious signal, in addition to the desired color representative signal. All of the signal energy is applied to the signal adder circuit 116. The demodulator 114, which has applied to it only demodulated luminance components, produces a counter phase spurious component in its output (C in FIG. 2D) which is also applied to the adder circuit 116. Rectifiers in the secondary demodulator 114 are poled in order that its output spurious signal C will be of the correct phase for cancellation of the spurious signal from the demodulator 20B so that the output of the adder circuit 116 includes a color representative signal without any spurious luminance component in the range of filter 58. It is contemplated that the modulator 114 could be constructed in a manner similar to that of FIG. 3, and, it can, of course, be duplicated with other adder circuits associated with the demodulators 20C and 20D for production of blue and green representative signals, free of spurious luminance signals.

The operation of the demodulator 114 can be understood mathematically by reference to the following product:

(6) $(E_Y)\Delta T/T(1 - 2A_1\cos\omega t + 2A_2\cos 2\omega t\ \ldots)$

Its operation is the multiplication of the luminance components $E_Y$ by a phase reversed form of the gating function of Equation 4. The output of the demodulator 114 is thus seen to include an $E_Y$ component (not required as 20B provides that also) as well as a term of opposite sign to that of the fourth term of Equation 5 so that it is cancelled. There are also higher order components as harmonics of the subcarrier frequency but these fall outside the passband 58′.

In the case of demodulators for the blue and green representative signals, the A coefficients of Equation 6 would be changed correspondingly as previously discussed and the phase of the angle would be changed to $\omega t + 146°$ for the green representative signal and the AC component would be changed to sine functions for the blue representative signal.

In the circuit of FIG. 3 a portion of the composite signal is available in the demodulator due to the unbalance introduced by resistor 61. This of course means that the brightness signal $E_Y$ is available for proper demodulation with the subcarrier wave to directly produce the desired color representative signal. Thus control of the variable resistor 61 provides the proper level of the $E_Y$ signal with respect to the color subcarrier to compensate for the demodulator efficiency and the K coefficient of the composite video signal.

Another method of achieving the proper combination of brightness to chrominance is to vary the effective values of the K coefficients by adjusting the amplitude of the subcarrier wave with respect to the brightness components in the range below the subcarrier components.

The A constants in the demodulation formulas for the composite signal are 1.14 for the red signal, 2.03 for the blue signal, and 0.70 for the green signal. Whereas the green representative signal can be demodulated without special techniques, the red and blue representative signals require special handling in order to establish the proper ratio of the brightness signal to the color component so that the resultant singal of the demodulator represents the brightness, hue and saturation for application to the picture tube 30. In a system which does not adjust $E_Y$ an $E_{SC}$ adjustment is feasible since the demodulating signal is a limiting factor. The A constants represent the coefficients of a Fourier expansion of the gating function. If the gate signal is assumed to be rectangular (as it may be for practical purposes if it has sufficient amplitude, even though it may in total be a sine wave) the coefficients can be represented as:

$$A_n=\frac{\sin(\pi F)}{n\pi F}$$

where F equals the duty cycle of the gate pulse. Since this function has a maximum value of unity, a technique must be used to effectively achieve a K over one in the signal so the A and K product equals one (see Eq. 5).

Figures 5, 6, 7:
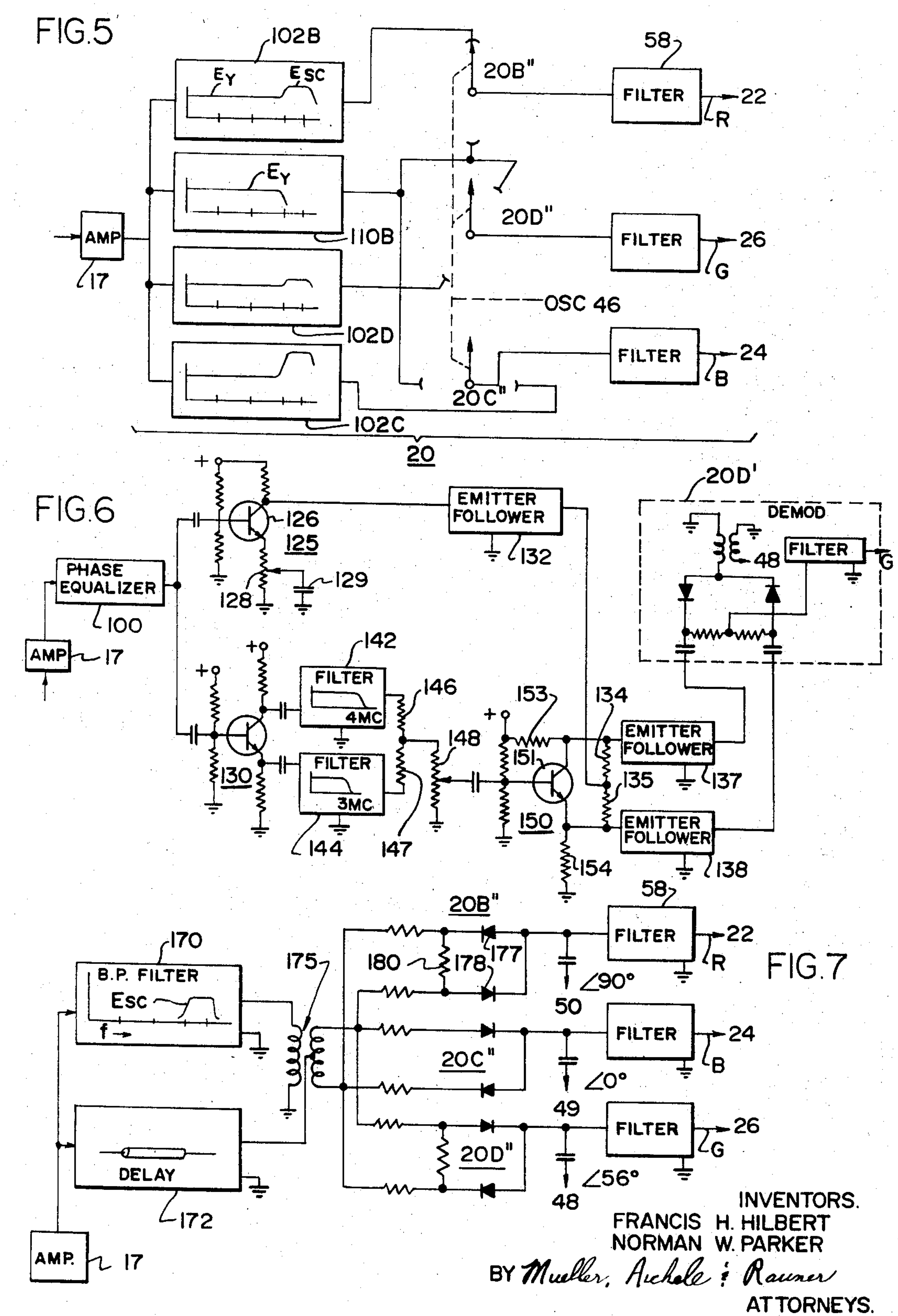
FIG. 5 is a block diagram of another form of the invention.
FIG. 6 is a schematic and block diagram illustrating a modified form of the invention.
FIG. 7 is a schematic and block diagram showing a still further form of the invention that may be used in the system of FIG. 1.

FIG. 5 illustrates a circuit which uses step filters for subcarrier amplitude correction, and which shows the signal demodulators as gates. The spurious signal cancellation occurring in FIG. 5 is similar in operation to that of the circuitry of FIG. 4.

In FIG. 5 the demodulator 20B'' is represented as a rotating switch arm under control of the signal from oscillator 46. Its output is applied to a filter 58 having a pass range for example corresponding to that of FIG. 2C.

Amplifier 17 supplies the composite signal $E_C$ to the step filter 102B having an increased amplitude for the subcarrier components around 3.58 mHz. The demodulator 20B'' is also fed with signals from low pass filter 110B which selects only the brightness component. It can be seen that the brightness signal $E_Y$ and the subcarrier $E_{SC}$ will be sampled by a primary demodulator portion and applied to the filter 58 to produce the red representative signal. In addition an opposite phase sampling of the $E_Y$ components takes place in a secondary section from the filter 110B to cancel the spurious signal modulation components as previously discussed.

The demodulators 20D'' and 20C'' produce the green and blue representative signals since these demodulators are conductive at different portions of the reference signal cycle corresponding to the color information at that phase of the reference. The step filter 102D and the step filter 102C as well as the filter 102B all sufficiently peak the subcarrier so that the A constants can be arbitrarily chosen to be less than 1 (for example by adjusting the sample width). As an example the step filter 102D may double the amplitude of the subcarrier over the amplitude of the $E_Y$ components, the filter 102B may increase the subcarrier 3.5 times and the filter 102C may increase the subcarrier 6.3 times. In this way the effective values of the K components are changed in the composite signal applied to the switching devices so that the desired color representative signals are directly produced. Since the high frequency brightness response in the region of the subcarrier frequency (where it may overlap the subcarrier modulation components) will also be unduly peaked by the step filters in the circuit of FIG. 5, it may be desirable to reduce the video frequency response in the region of subcarrier frequency in the filters at the output of the demodulators 20B'', 20D'' and 20C''.

In implementing a circuit such as shown in FIG. 5 it will be recognized that a pair of diodes can be used to perform the switching function and that these would be oppositely poled and controlled by a signal of the proper phase angle in the oscillator 46. The circuit of FIG. 3 uses unbalance of the detector to adjust the brightness to chrominance ratio whereas the circuit of FIG. 5 uses step filters for chrominance to brightness ratio but in either case the brightness and refence signal modulation product is cancelled through a secondary modulation process which provides a cancelling signal from combination of the brightness signal with a properly phased reference signal.

In the demodulator system of FIG. 6 production of the spurious signal components S (FIG. 2D) is avoided due to application of the chrominance subcarrier wave in a balanced manner to a balanced demodulator and in the application of the luminance components in an unbalanced manner to the balanced demodulator. This has the advantage that the subcarrier wave will be demodulated in a full wave manner so that less subcarrier prepeaking is required as compared to the circuit of FIG. 5. The function of the primary and secondary demodulators is combined so that each section of the demodulator performs both functions. This operation can be understood by considering the operation mathematically.

Demodulator 20D' has a second portion with opposite phase subcarrier and reverse phase diode (equivalent to opposite phase reference signal) with respect to the first section of the demodulator. Accordingly the following equation represents the operation of the second section:

$$(7)\quad (E_Y-E_{SC})(\Delta T/T)(1-2A_1\cos\omega t+2A_2\cos 2\omega t\ \ldots)=\Delta T/T(E_Y-K_1(E_R-E_Y)\cos\omega t-K_2(E_B-E_Y)\sin\omega t-2A_1E_Y\cos\omega t+A_1K_1(E_R-E_Y)+A_1K_1(E_R-E_Y)\cos 2\omega t+\text{components}>2\omega)$$

When the outputs of the demodulator sections represented by Equations 5 and 7 are combined, the first terms of the two equations are additive, and the second and third terms cancel one another to remove the original subcarrier wave in the output. The fourth terms of the equations cancel as is desired to obviate the spurious brightness and reference modulation component. The fifth terms are additive and the remaining terms are inconsequential in the system. The circuit of FIG. 6 operates in accordance with the above description.

In FIG. 6 the amplifier 17 applies the demodulated composite video signal to the phase equalizer 100 and from there the signal is coupled to an amplifier 125 and a phase splitter 130. Amplifier 125 includes a transitor 126 having an emitter electrode connected to ground through a resistor 128. A variable arm with resistor 128 is bypassed for signal frequencies by a capacitor 129 so that at the collector electrode of transistor 126 there appears a selected amplitude of the composite video signal.

A time delay and emitter follower 132 couples the composite video signal to the interconnection of resistors 134 and 135 connected between the transistorized emitter followers 137 and 138.

The phase splitter 130 includes a transistor 140 having a collector electrode coupled to a wide band filter 142 which passes the composite signal including luminance and chrominance modulation in the frequency range out to approximately 4 megacycles. The emitter electrode of transistor 140 is coupled through a filter 144 having a pass range up to approximately 3 megacycles, which thus passes the luminance components and excludes the chrominance modulation components. The outputs of filters 142, 144 are coupled respectively through resistors 146 and 147 to a fixed terminal of variable resistor 148 which has a further fixed terminal connected to ground. The variable arm of the resistor 148 is coupled to the transistor 151 in the phase splitter 150. The collector and emitter electrodes both include load impedances, namely resistors 153 and 154 respectively which are coupled to the emitter follower stages 137, 138.

Accordingly, opposite phases of differing portions of the composite video signal are applied to the variable resistor 148. These different portions include opposite phases of the luminance components so that these are effectively cancelled leaving only the chrominance components coupled through the filter 142. Thus adjustment of resistor 148 will place a variable drive of the chrominance modulation components on the base electrode of transistor 151 so that the output thereof will be opposite phases of a selected amplitude of the chrominance modulation components. The emitter followers 137 and 138 will thus produce output signals which are opposite phases of the chrominance modulation components and the same phase of the luminance modulation components, applied to the emitter followers in a parallel circuit through the resistors 134 and 135.

Emitter follower circuits 137 and 138 are each coupled to the two input terminals of the demodulator circuits such as 20D'. It may be seen that the particular circuitry of demodulator circuit 20D' corresponds generally to the circuit of FIG. 3, with the exception that the circuit 20D' is balanced and no unbalancing resistor, such as resistor 61, is included. As the input to demodulator 20D' will include opposite phases of the chrominance modulation components, these will be detected as described in connection with the circuit of FIG. 3. Furthermore, the input to the demodulator 20D' will include the same phase of luminance components applied to each input terminal, with respect to ground, so that the luminance components ($E_Y$) will be conducted into the demodulator to be combined with the demodulated chrominance component ($E_G-E_Y$) and a color representative signal is directly produced at the output.

FIG. 7 illustrates a demodulation system incorporating a form of the subcarrier peaking suggested in the system of FIG. 5 together with balanced demodulators which are driven as a two section demodulator which is fed with the luminance components $E_Y$ in push-push and the subcarrier wave $E_{SC}$ in push-pull for alternate sampling of the composite in accordance with the Equations 5 and 7 as in 20D' of FIG. 6.

In the circuit of FIG. 7 a composite signal from amplifier 17 is applied to a bandpass filter 170 which selects the subcarrier wave. Amplifier 17 is also DC coupled through a compensating delay line 172 to the center tap of the secondary of transformer 175. A selected amplitude of the subcarrier wave is applied to the primary of the transformer 175 to appear across the secondary with opposite phases with respect to the luminance feed point.

The demodulator 20B'' includes a resistor network coupled across the secondary of transformer 175 with the diodes 177 and 178 series coupled across intermediate resistor 180 of the resistive network. Since the signal $E_Y$ is at the same amplitude and polarity on both sides of the secondary winding of transformer 175 it will be conducted at the same amplitude by both diodes. On the other hand opposite phases of the subcarrier wave are applied to the ends of resistor 180 and selection of the values in this resistive network can thus provide a desired ratio of subcarrier to luminance effectively producing a step filter like 102B at the input to the diodes 177 and 178. This compensates for the A coefficients previously discussed, as well as the demodulator efficiency.

The diodes 177 and 178 are oppositely poled and coupled through a capacitor to the terminal 50 of the oscillator 46. These diodes are also coupled to the filter 58 which applies the red and high frequency luminance representative signal corresponding to FIG. 2B to the amplifier 22. The other demodulators 20C'' and 20D'' correspond in circuitry to 20B'' except that the phase angle of the applied reference differs and the input resistive networks differ in order to properly peak the subcarrier wave with respect to the luminance component. Each demodulator is DC coupled through its filter and amplifier to the reproducer 30.

The operation of the circuit of FIG. 7 corresponds to that given for circuit 20D' of FIG. 6. The selected phase of the subcarrier wave will be conducted to the demodulator output filter for effective full wave rectification of it and the signal $E_Y$ will be present in the demodulator to be processed at twice the reference carrier frequency for simultaneous combination to produce the color representative signal directly. While each one of the diode electron switch devices will produce a modulation product between the $E_Y$ signal and the applied switching signal of reference frequency, the two switches conduct out of phase with one another so that the modulation products of the two cancel in the demodulator output, all as discussed in connection with Equations 5 and 7. Thus direct color signal demodulation takes place but the false modulation components normally developed in such a system are obviated.

The system hereof therefore provides decoding of the multiplex color television signal of the NTSC type. This system could also operate upon a composite signal of intermediate frequency (before demodulation of the main carrier) if proper circuitry is used for subcarrier amplitude adjustment. In successful practice the system produces the desired red, green and blue representative signals from the composite signal in whatever form without the need for matrixing techniques and adjustments normally associated with receivers utilizing more than the three video signal channels.

We claim:

1. A color television demodulation system for utilizing a composite signal including video frequency brightness components and a subcarrier wave modulated in amplitude and phase to represent color information, said subcarrier wave having modulation components at least partially overlapping in frequency the brightness components, said demodulation system including in combination:

a first synchronous demodulator including an input circuit for the composite signal and means for applying thereto a control signal of the subcarrier frequency, said first demodulator also including an output circuit for the demodulated video signal representing brightness, hue and saturation information in the composite signal, the video frequency brightness components beating in said first demodulator with the control signal of subcarrier frequency to produce a spurious signal in said output circuit, and a second synchronous demodulator including means for applying thereto the video frequency brightness components and a signal phase locked to the subcarrier frequency to beat the same together to produce a cancellation signal for the spurious signal, and means for applying the cancellation signal to said output circuit of said first synchronous demodulator with an amplitude and phase to offset development of the spurious signal in said first synchronous demodulator.

2. The demodulation system of claim 1 in which said first demodulator is a half-wave rectifier for the subcarrier wave.

3. The demodulation system of claim 1 in which said first demodulator is a full-wave rectifier for the subcarrier wave.

4. The demodulator system of claim 1 which includes means for applying the subcarrier wave to said second demodulator and wherein said second demodulator tends to produce a further spurious signal from beating of the brightness components and the control signal, and wherein the first and second demodulators conduct out-of-phase with one another so that said first demodulator produces a further cancellation signal for the further spurious signal.

5. The demodulation system of claim 1 in which said first demodulator is unbalanced for conducting a preselected portion of the brightness components.

6. The demodulation system of claim 1 wherein said input circuit includes means for establishing a selected amplitude of the subcarrier wave with respect to the brightness components.

7. In a color television receiver including receiver circuit means providing a demodulated color television signal comprising video frequency luminance components in a given frequency range, and a subcarrier modulated in amplitude and phase to represent color difference information and having modulation components overlapping the given frequency range, and oscillator means providing an oscillator signal of the subcarrier frequency and of selected phase for demodulating one phase of the modulated subcarrier, the combination of a demodulator circuit coupled to said receiver circuit means and to said oscillator means to be controlled by the oscillator signal and the modulated subcarrier and the luminance components, said demodulator circuit having an output circuit and being operative to detect one phase of the modulated subcarrier in the presence of the luminance components to produce a color representative signal, and said demodulator circuit further being operative to produce spurious frequency components within the frequency range of the luminance components in said output circuit thereof by beating of the luminance components with the oscillator signal, and means including a further demodulator coupled between said circuit means and said output circuit for producing a cancelling signal for the spurious frequency components appearing in said output circuit.

8. In a color television receiver including receiver circuit means providing a demodulated color television signal comprising video frequency luminance components in a given frequency range, and a subcarrier modulated in amplitude and phase to represent color difference information and having modulation components overlapping the given frequency range, and oscillator means providing an oscillator signal of the subcarrier frequency and of selected phase for demodulating one phase of the modulated subcarrier, the combination of a demodulator circuit including three phase detectors, each with dual input circuits for demodulating opposite phases of applied signals, means applying different phases of the oscillator signal to said detectors, and means coupling said receiver circuit means to said detectors including a network coupling the luminance components to said detectors with the same polarity at both input circuits of each and coupling the modulated subcarrier to said input circuits of each with opposite phases.

9. In a color television receiver including circuit means providing a television signal comprising video frequency luminance components in a given frequency range and a subcarrier modulated in amplitude and phase to represent color difference information, and oscillator circuit means providing a control signal of the subcarrier frequency, the combination of a demodulator circuit including an output circuit and switching means under control of the oscillator signal, means applying the color television signal to said switching means so that a signal representing brightness and saturation for a given color is applied to said output circuit, and further switching means coupled to said output circuit and under control of the oscillator signal to be conductive in opposite phase to said first mentioned switching means, and means applying at least the luminance components to said further switching means for cancelling luminance components modulated with the oscillator signal in said output circuit.

References Cited

UNITED STATES PATENTS 2,917,573 12/1959 Holmes ------------- 178—5.4

ROBERT L. GRIFFIN, *Primary Examiner.*

R. MURRAY, *Assistant Examiner.*